(No Model.)
P. M. CUNNINGHAM.
POOL TABLE CONDUIT.
No. 556,532. Patented Mar. 17, 1896.
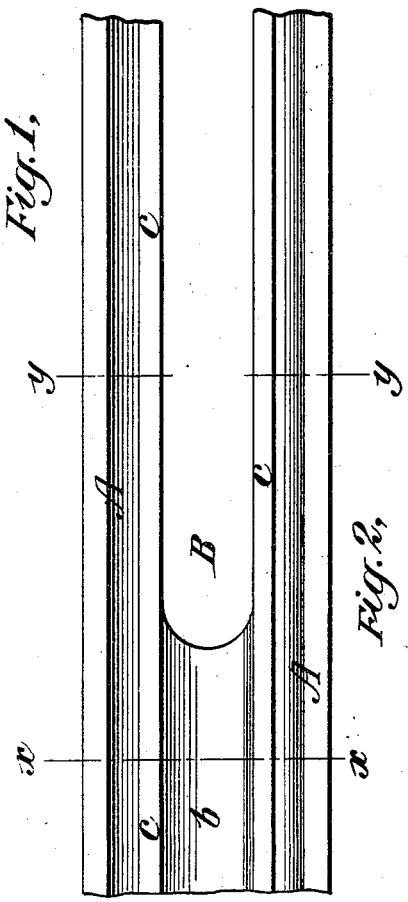
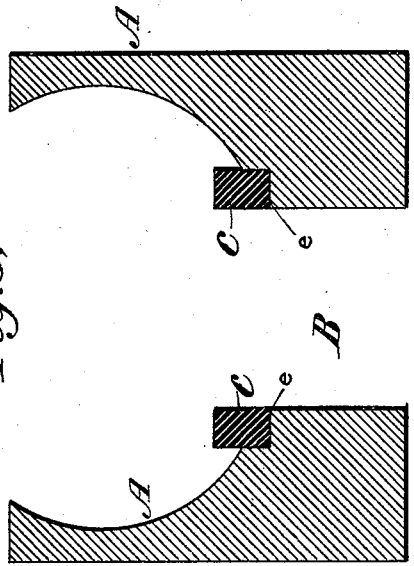
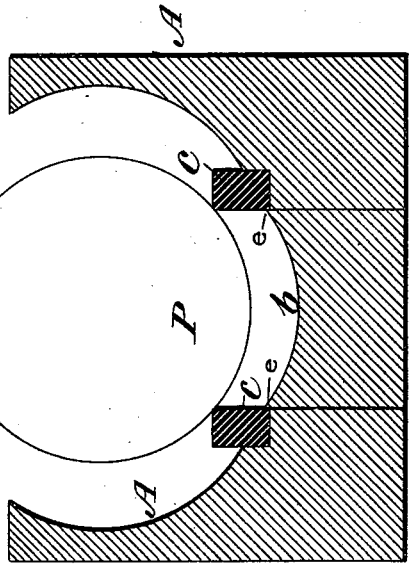
Witnesses:-
D. A. Raynord
B. R. Ryan
Inventor:-
P. M. Cunningham
By atty
J. N. McIntire

UNITED STATES PATENT OFFICE.

PATRICK M. CUNNINGHAM, OF NEW YORK, N. Y., ASSIGNOR TO THE BRUNSWICK-BALKE-COLLENDER COMPANY, OF CHICAGO, ILLINOIS.

POOL-TABLE CONDUIT.

SPECIFICATION forming part of Letters Patent No. 556,532, dated March 17, 1896.

Application filed September 13, 1895. Serial No. 562,364. (No model.)

*To all whom it may concern:*

Be it known that I, PATRICK M. CUNNINGHAM, a citizen of Great Britain, residing at New York, in the county of New York and State of New York, have invented a certain new and useful Improved Pool-Table Conduit, of which the following is a full, clear, and exact description, reference being had to the accompanying drawings, forming part of this specification.

My invention relates to the conduits or ball-troughs of that species of pool-table in which the balls holed descend through bottomless pockets into the upper end portions of downwardly-inclined wooden conduits or troughs, by which they are conducted to a receptacle located beneath the bed of the table at the foot of the latter in a manner and for the purposes well known to the makers and users of this kind of pool-tables. Previous to my invention this conduit has been made in the form of a rectangular trough with an oblong opening in its bottom, and lined with cloth to prevent much of the noise or racket that would otherwise be made by the tumbling about and rolling along of the balls within the troughs. Such conduits or ball-troughs have, however, been found to be defective or objectionable in practice mainly in these particulars, viz: First, that considerable noise is made by the passage of the balls through them, and, second, the cloth linings very soon wear out or get worn into such a condition that they require repairing, which involves considerable trouble and expense.

I propose by an improvement to provide for use a ball-conduit which, while it will be less expensive of manufacture to start with than the cloth-lined troughs, will be more noiseless and more durable than any heretofore made that I know of.

To these main ends and objects my invention consists in a ball conduit or conductor provided with two ways composed of strips of vulcanized rubber or other suitable comparatively soft but durable material, the wooden portion of the conduit being so made and the said ways so combined therewith that the ball will travel wholly on the angular parts of the said noiseless ways and out of contact with the wooden surfaces of the trough, all as will be hereinafter more fully explained and as will be most particularly pointed out in the claims of this specification.

To enable those skilled in the art to which my invention relates to make and use pool-table conduits embodying the same, I will now proceed to more fully describe the latter, referring by letters to the accompanying drawings, which form part of this specification, and in which I have shown my improvement carried out precisely as I have so far practiced it, largely in the manufacture of pool-tables.

In the drawings, Figure 1 is a top or plan view of part of a conduit made according to my invention, portions of the trough being broken away in order to make the drawing of this view on a larger scale than would otherwise be possible. Fig. 2 is a cross-section at the line $x$ $x$ of Fig. 1, but showing a pool-ball in the conduit and drawn on a scale of full size. Fig. 3 is a cross-section at the line $y$ $y$, full size.

In the several figures the same part will be found designated always by the same letter of reference.

As shown in the drawings, my improved conduit is composed of two side pieces (of wood) A A, placed parallel with each other and having their lower portions connected during a portion only of their length by intermediately-located wooden strips or parts $b$, securely glued thereto, so that the completed conduit or trough has an oblong opening B during the greater part of its length for the purpose of affording a free escape from the conduit of any pieces of chalk that may be thrown into the table-pockets and descend thence into the ball-conduits.

Each of the parts A A is formed with a rabbet or angular seat at $e$, (see Figs. 2 and 3,) which runs the entire length of the conduit, and in each of said rabbets or recesses is seated and securely fastened, preferably by gluing, a rubber strip $c$, which is rectangular in cross-sectional shape and of about the size shown in the full-sized figures. These two strips $c$ $c$ form ways or skids on which the pool-ball travels or rolls from the time it enters until it leaves the conduit, and as these ways are made of a comparatively-soft rubber compound (about such as billiard cushion-strips are usually made of) the movement or passage of the ball through the conduit is perfectly noiseless.

By reference particularly to Fig. 2 it will be seen that the ball P not only never comes into contact with any surface or part of the ball-conducting device except the rubber ways $c\,c$, but, furthermore, that it travels always on the upper inner corners or edges of these elastic ways; and it will be understood that by reason of this structural feature of the conduit-trough shown not only is all expensive and perishable cloth lining of its interior surfaces rendered unnecessary, so that both the first cost and that of keeping in repair the table-troughs are reduced, but, furthermore, the conduction of the ball wholly on the angular portion of the noiseless skids or ways $c\,c$ renders the operation of the conduit more efficient and desirable than that of any ball-trough heretofore made.

While I have by experiment and practice learned that the material above named is about the best for the ways $c\,c$, they might, of course, be made of some other which would be sufficiently soft, durable, and noiseless or would induce to a sufficiently-noiseless travel of the balls to answer well the purposes of my improved conduit.

The precise sizes and proportions of the parts shown may, of course, be varied more or less without changing the novel construction and improved results of the device shown, and hence without departing from my invention.

What I claim as new, and desire to secure by Letters Patent, is—

1. The wooden ball-trough for pool-tables, provided with the rabbets $e$, and with strips C, C of elastic material, such as is described, secured in the rabbets so that the ball will travel only on their upper and inner edges; as and for the purpose set forth.

2. The wooden ball-trough for pool-tables comprising the pieces A, A, and $b, b$, provided with rabbets $e$ in the pieces A, A; and with the strips C, C of elastic material, such as is described, secured in the rabbets so that the ball will travel along their upper and inner edges; as and for the purpose set forth.

In witness whereof I have hereunto set my hand this 17th day of July, 1895.

P. M. CUNNINGHAM.

In presence of—
JAS. J. BYRNES,
ERNEST J. TAROF.

It is hereby certified that the assignee in Letters Patent No. 556,532, granted March 17, 1896, upon the application of Patrick M. Cunningham, of New York, N. Y., for an improvement in "Pool-Table Conduits," should have been described and specified as *The Brunswick-Balke-Collender Company, of Chicago, Illinois, a corporation of Ohio*, instead of "The Brunswick-Balke-Collender Company, of Chicago, Illinois;" and that the said Letters Patent should be read with this correction therein that the same may conform to the record of the case in the Patent Office.

Signed and sealed this 12th day of October, A. D., 1909.

[SEAL.]

C. C. BILLINGS,
*Acting Commissioner of Patents.*